(12) United States Patent
Kruglick

(10) Patent No.: US 10,394,318 B2
(45) Date of Patent: *Aug. 27, 2019

(54) SCENE ANALYSIS FOR IMPROVED EYE TRACKING

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/286,222

(22) Filed: Oct. 5, 2016

(65) Prior Publication Data
US 2017/0024893 A1 Jan. 26, 2017

Related U.S. Application Data

(63) Continuation of application No. 14/458,577, filed on Aug. 13, 2014, now Pat. No. 9,489,739.

(51) Int. Cl.
G06K 9/00 (2006.01)
G06F 3/01 (2006.01)
(Continued)

(52) U.S. Cl.
CPC ............ *G06F 3/013* (2013.01); *G02B 27/017* (2013.01); *G02B 27/0172* (2013.01); *G06K 9/00604* (2013.01); *G06K 9/00671* (2013.01); *G06K 9/4642* (2013.01); *G06T 7/74* (2017.01); G02B 27/0093 (2013.01); G02B 2027/014 (2013.01);
(Continued)

(58) Field of Classification Search
CPC ........ G02B 27/0172; G02B 2027/0178; G02B 2027/0138; G02B 2027/0187; G02B 27/017; G02B 2027/014; G02B 27/0093; G06F 3/013; G06T 2207/30201;
(Continued)

(56) References Cited

U.S. PATENT DOCUMENTS 8,235,529 B1 * 8/2012 Raffle ................. A61B 3/113
351/209
8,510,166 B2 8/2013 Neven
(Continued)

FOREIGN PATENT DOCUMENTS

CN 103955267 A 7/2014

OTHER PUBLICATIONS

MIT Media Lab, Camera Culture Group, "Google Glass Breakdown," Slide Presentation, Sep. 16, 2013, 25 pages.
(Continued)

Primary Examiner — Shaghayegh Azima

(57) ABSTRACT

Technologies related to scene analysis for improved eye tracking are generally described. In some examples, detected gaze targets may be derived from gaze direction information from an eye-facing sensor. Detected gaze target positions and/or motion may be improved by capturing and analyzing digital scene information from a scene visible by the eye. Digital scene information captured by a digital camera may be analyzed to identify potential gaze targets, such as stationary gaze targets, moving gaze targets, and/or accelerating gaze targets. Detected gaze targets may be modified to positions of selected gaze targets.

21 Claims, 5 Drawing Sheets

(51) Int. Cl.
*G02B 27/01* (2006.01)
*G06T 7/73* (2017.01)
*G06K 9/46* (2006.01)
*G02B 27/00* (2006.01)

(52) U.S. Cl.
CPC ............ *G02B 2027/0138* (2013.01); *G02B 2027/0178* (2013.01); *G02B 2027/0187* (2013.01); *G06K 2209/21* (2013.01); *G06T 2207/30201* (2013.01)

(58) Field of Classification Search
CPC .... G06T 7/74; G06K 9/00604; G06K 9/4671; G06K 9/4642; G06K 2209/21
See application file for complete search history.

(56) References Cited

U.S. PATENT DOCUMENTS

| | | | | |
|---|---|---|---|---|
| 2005/0225723 | A1* | 10/2005 | Pilu | A61B 3/113 351/209 |
| 2008/0165195 | A1* | 7/2008 | Rosenberg | G06T 13/40 345/473 |
| 2008/0309671 | A1* | 12/2008 | Shuster | G06T 15/20 345/474 |
| 2009/0022368 | A1* | 1/2009 | Matsuoka | B60K 35/00 382/103 |
| 2010/0053555 | A1* | 3/2010 | Enriquez | A61B 3/113 351/210 |
| 2010/0321482 | A1* | 12/2010 | Cleveland | G06F 3/012 348/78 |
| 2011/0019874 | A1* | 1/2011 | Jarvenpaa | A61B 3/113 382/103 |
| 2012/0290401 | A1* | 11/2012 | Neven | A61B 3/113 705/14.68 |
| 2012/0294478 | A1* | 11/2012 | Publicover | G06K 9/00604 382/103 |
| 2013/0128364 | A1* | 5/2013 | Wheeler | A61B 3/113 359/630 |
| 2014/0089243 | A1* | 3/2014 | Oppenheimer | G06F 21/50 706/46 |
| 2014/0176827 | A1* | 6/2014 | Gollier | G02B 1/10 349/12 |
| 2014/0184550 | A1* | 7/2014 | Hennessey | G06F 3/013 345/173 |
| 2014/0313308 | A1* | 10/2014 | Wang | G06K 9/00604 348/78 |
| 2015/0088923 | A1* | 3/2015 | Garcia-Barrio | G06F 16/583 707/769 |
| 2015/0097772 | A1* | 4/2015 | Starner | G06F 3/013 345/158 |
| 2015/0109191 | A1* | 4/2015 | Johnson | G10L 15/22 345/156 |
| 2015/0123991 | A1* | 5/2015 | Yarosh | G02B 27/017 345/629 |
| 2016/0048964 | A1 | 2/2016 | Kruglick | |

OTHER PUBLICATIONS

Uswak, "Google Glass controlled by winking—code, hardware, and official google info," Internet Article accessed at http://glass-apps.org/google-glass-controlled-by-winking, Apr. 22, 2013, 7 pages.

Beach, G., et al., "Eye Tracker System for Use with Head Mounted Displays," In 1998 IEEE International Conference on Systems, Man, and Cybernetics, vol. 5, pp. 4348-4352 (1998).

Dean, T. et al., "Fast, Accurate Detection of 100,000 Object Classes on a Single Machine," In IEEE Conference on Computer Vision and Pattern Recognition, pp. 1814-1821 (2013).

Firth, N., "Eye-tracker lets you drag and drop files with a glance," Internet Article accessed at http://www.newscientist.com/article/dn24742-eyetracker-lets-you-drag-and-drop-files-with-aglance#.U9-iXOOSxDQ, Dec. 11, 2013, 2 pages.

Hsu, J., "Will Pay-Per-Gaze Advertising Reach Google Glass?," Internet Article accessed at http://spectrum.ieee.org/tech-talk/consumer-electronics/gadgets/pay-per-gaze-advertising-google-glass, Aug. 23, 2013, 2 pages.

Hua, H. et al., "Video-based eyetracking methods and algorithms in head-mounted displays," Optics express, vol. 14, No. 10, pp. 4328-4350 (2006).

Hua, H., "Integration of Eye Tracking Capability into Optical See-through Head-mounted Displays," Proc. SPIE, vol. 4297, pp. 496-503 (2001).

Mantiuk, R. et al., "Gaze-Driven Object Tracking for Real Time Rendering," Computer Graphics Forum, vol. 32, No. 2 pt2, pp. 163-173 (2013).

Paletta, L. et al., "A Computer Vision System for Attention Mapping in SLAM based 3D Models," Part of the OAGM/AAPR. 2013 proceedings, 8 pages (2013).

Papenmeier, F. and Huff, M., "DynAOI: A tool for matching eye-movement data with dynamic areas of interest in animations and movies," Behavior Research Methods, vol. 42, No. 1, pp. 179-187 (2010).

Vansteenkiste, P. et al., "Dealing with Head-Mounted Eye-Tracking Data: Comparison of a Frame-by-Frame and a Fixation-Based Analysis," Proceedings of Eye Tracking South Africa, Cape Town, Aug. 29-31, 2013, pp. 55-57.

Eye Gaze (LC Technologies, Inc.), "Eye Tracking—Volkswagen—2013 Super Bowl Commercial," Webpage, accessed at https://www.youtube.com/watch?v=bITGPkPxbac, Feb. 5, 2013, 2 pages.

* cited by examiner

SCENE ANALYSIS FOR IMPROVED EYE TRACKING

CROSS-REFERENCE TO RELATED APPLICATION

The present application is a continuation application under 35 U.S.C. § 120 of U.S. application Ser. No. 14/458, 577, entitled "SCENE ANALYSIS FOR IMPROVED EYE TRACKING," now U.S. Pat. No. 9,489,739, filed on Aug. 13, 2014, the entire contents of which are incorporated herein by reference.

BACKGROUND

Unless otherwise indicated herein, the materials described in this section are not prior art to the claims in this application and are not admitted to be prior art by inclusion in this section.

Eye tracking systems may include small cameras which can track motions of the human eye. Eye tracking has a variety of useful and interesting applications. For example, eye tracking can be deployed in Augmented Reality (AR) applications, as well as various medical and industrial applications. Eye tracking also has a variety of potential User Interface (UI) applications such as, for example, allowing a device user's gaze to control a selection pointer. A device user may gaze at a virtual object such as a file, press a button, then gaze at a destination location for the object and release the button to transfer the object. Eye tracking also presents opportunities to collect user interest and user activity information, e.g., to understand whether users have seen at an advertisement. These and other uses for eye tracking present numerous interesting possibilities. However, eye tracking technologies remain in a relatively early stage of development, and there are many challenges to address as eye tracking matures.

SUMMARY

The present disclosure generally describes technologies including devices, methods, and computer readable media relating to scene analysis for improved eye tracking. Some example eye tracking methods performed by a computing device may comprise receiving eye gaze direction information from an eye-facing sensor; receiving digital scene information from a digital camera, wherein the digital camera may be oriented to capture the digital scene information from a scene visible by the eye; determining, based on the gaze direction information, a detected gaze target within the digital scene information; analyzing the digital scene information to identify potential gaze targets, within the digital scene information, wherein the potential gaze targets may comprise, e.g., stationary gaze targets, moving gaze targets, and/or accelerating gaze targets; selecting a potential gaze target; and/or modifying the detected gaze target to a position of the selected gaze target.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include, e.g., head mounted devices comprising a digital camera, an eye-facing sensor, and a computing device equipped with an eye tracking accuracy enhancer configured to carry out any combination of the various methods provided herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
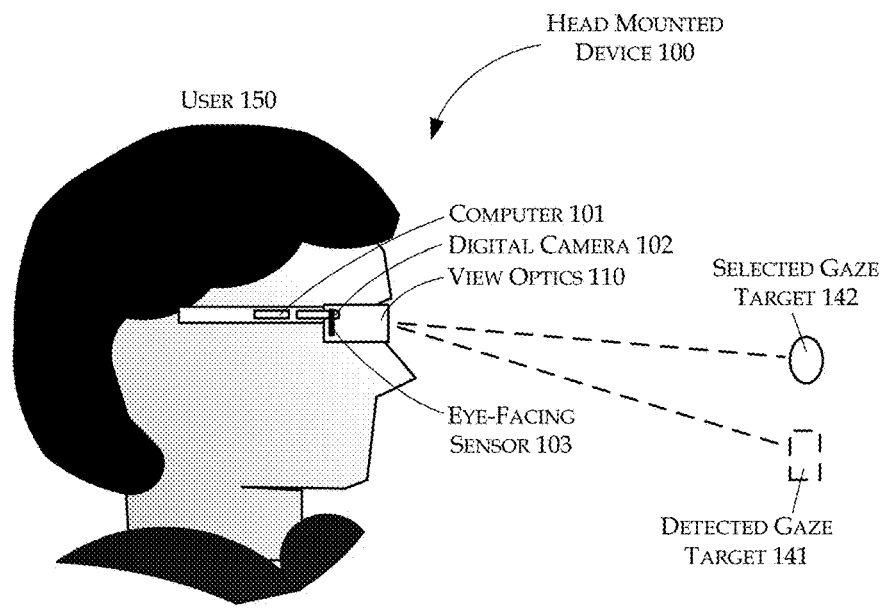
FIG. 1 is a diagram illustrating an example head mounted device being worn by a user.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to scene analysis for improved eye tracking. In some examples, gaze targets may be derived from gaze direction information from an eye-facing sensor. Gaze target positions and/or motion may be improved by capturing and analyzing digital scene information from a scene visible by the eye. Digital scene information captured by a digital camera may be analyzed to identify potential gaze targets, such as, by way of example, stationary gaze targets, moving gaze targets, and/or accelerating gaze targets. Detected gaze targets may be modified to include positions of selected potential gaze targets, also referred to herein as "selected gaze targets".

In some embodiments, technologies described herein may be incorporated into head mounted devices, such as, by way of example, GOOGLE GLASS® type devices. Such devices may provide, e.g., a transparent lens through which the user may view the physical world. Devices may furthermore display digital objects and information on the lens. Devices may allow users, such as wearers of head mounted devices, to select the digital objects and information to be displayed, as well as to interact with the objects and information. Devices may optionally connect to computer networks, e.g., by wirelessly connecting to the Internet. Devices may also include integrated digital cameras, and devices may allow users to capture digital photographs and video of scenes as viewed through the lens. In addition to these and other features as may be included in example devices, devices may incorporate eye-facing sensors and may be equipped to perform eye tracking methods such as those described herein.

Eye-facing sensors may comprise higher cost, higher accuracy sensors, or lower cost, lower accuracy sensors. Embodiments of this disclosure may involve any type of eye-facing sensor. Higher cost, higher accuracy sensors may, for example, comprise cameras which capture high resolution visible light images of the eye, and eye tracking systems may conduct relatively more processing to achieve greater accuracy of calculated eye position. Lower cost, lower accuracy sensors may, for example, comprise cameras which capture lower resolution infrared (IR) light images of the eye, and eye tracking systems may conduct relatively less extensive processing to achieve relatively less accuracy of calculated eye position.

There are fundamental difficulties in eye tracking, resulting from difficulties in resolving very small and low contrast rotations in a smooth ball, namely, the eye. One problem with some eye-facing sensors and corresponding eye tracking systems is that the modest intensity and contrast of reflected IR light results in jumpy and difficult-to-resolve motion that can result in estimating inaccurate gaze directions. While high resolution, visible light eye tracking systems may fare better, such eye tracking systems use more expensive eye-facing sensor cameras and more processing power, and do not function as well in low light conditions.

The difficulties of eye tracking are especially pronounced in the context of physical, rather than virtual environments. In physical environments, current technologies provide no information regarding points of interest or other potential gaze targets of interest to the human eye, within physical scenes as viewed. Therefore, in some embodiments, technologies described herein may capture and analyze digital scene information from physical scenes visible by the eye, identify potential gaze targets, and use such identified potential gaze targets to improve gaze target positions and/or gaze target motion derived from eye-facing sensors.

In some embodiments, eye tracking systems may generate improved eye tracking target estimation, also referred to herein as gaze target estimation, by comparing detected eye tracking position, velocity, and/or acceleration values with estimated eye tracking values corresponding to physical world potential gaze targets. Potential gaze targets may be identified, e.g., in real time video of a physical world scene.

Potential gaze targets may be identified, e.g., using object recognition, or by applying any of a variety of graphics analysis algorithms to identify potential gaze targets, or, for example, by identifying object motion in a scene. Embodiments may subsequently determine position, velocity, and/or acceleration values for each identified potential gaze target, and may compare such determined values for to detected eye tracking position, velocity, and/or acceleration values.

Embodiments may select an appropriate potential gaze target comprising position, velocity, and/or acceleration values which substantially match detected eye tracking position, velocity, and/or acceleration values. Embodiments may then infer that correct eye tracking position, velocity, and/or acceleration values are those of the selected gaze target. Modified, improved eye tracking position, velocity, and/or acceleration values may, for example, be stored or otherwise used for any application which uses eye tracking information.

Embodiments may perform data transformations as appropriate to enable comparisons between detected eye tracking position, velocity, and/or acceleration values and potential gaze target position, velocity, and/or acceleration values. For example, in some embodiments, detected eye tracking position values may comprise angular coordinates corresponding to eye gaze direction. Meanwhile, potential gaze target position values may at least initially comprise, e.g., two dimensional x,y coordinates within the plane of a captured video frame. Detected eye tracking angular coordinates may be converted into two dimensional x,y coordinates to support comparison operations, for example using geometric relationships between the camera position and eye position, or vice versa. It will also be appreciated that embodiments may convert all information into any intermediate coordinate system as desired to support comparison operations.

In some embodiments, eye tracking systems may compare detected gaze targets with positions of stationary potential gaze targets in a physical scene, and may correct detected gaze targets within their noise boundaries by modifying the detected gaze targets to positions of the stationary potential gaze targets, as appropriate. In some embodiments, eye tracking systems may compare detected gaze directions with estimated gaze directions corresponding to positions of stationary potential gaze targets in a physical scene, and may correct detected gaze directions within their noise boundaries by modifying the detected gaze directions to the estimated gaze directions.

In some embodiments, eye tracking systems may compare detected gaze target motion (which may comprise gaze target velocity and/or gaze target acceleration, and which may be derived, e.g., from a series of detected gaze targets in a physical scene) with modeled gaze target motion to follow moving potential gaze targets in a physical scene, and embodiments may correct detected gaze target motion within its noise boundary by modifying the detected gaze target motion to the modeled gaze target motion to follow moving potential gaze targets in the physical scene. In some embodiments, eye tracking systems may compare detected eye motion (which may be derived, e.g., from a series of detected gaze directions) with modeled eye motions associated with following moving potential gaze targets in a physical scene, and embodiments may correct detected eye motion within its noise boundary by modifying the detected eye motion to the modeled eye motion to follow moving potential gaze targets in the physical scene, or to the potential gaze targets that match the modeled eye motion.

Example embodiments may capture images of the physical world as viewed by the user, or an approximation thereof. For example, embodiments may capture video using a digital camera proximal to the user's eye. Embodiments may analyze captured physical world images to extract physical world potential gaze targets. Such analysis may comprise object recognition in some embodiments. In some embodiments, any of a variety of algorithms may be adapted to identify, e.g., sets of related graphical features which may be related for example by color, proximity, texture, etc. Example algorithms include Speeded Up Robust Features (SURF), Scale Invariant Feature Transform (SIFT), and Kanade-Lucas-Tomasi (KLT) type algorithms. Each identified set of related graphical features may be considered as a potential gaze target, and by tracking positions of each identified set of related graphical features across multiple video frames, embodiments may establish velocities and accelerations of corresponding potential gaze targets.

Embodiments may calculate a first derivative of position information, over multiple video images and for each identified potential gaze target, to calculate velocity information for moving potential gaze targets. Embodiments may calculate second derivative of position information, over multiple video images and for each identified potential gaze target, to calculate acceleration information for accelerating potential gaze targets. Embodiments may also calculate first and second derivative information for detected gaze targets and/or gaze directions for comparisons with potential gaze target velocities and accelerations. Embodiments may calculate first and second derivative information using any of a variety of mathematical approaches, as will be appreciated, to produce comprehensive motion flows suitable for comparison operations.

Embodiments may modify detected eye tracking data by inferring intended gaze directions or gaze targets to be those of potential gaze targets in the physical world having positions, velocities, and/or accelerations which substantially match detected eye tracking data properties. For example, embodiments may select an identified potential gaze target having a substantially matching expected gaze target position, expected gaze target velocity, and/or expected gaze target acceleration, which substantially matches detected gaze target positions and/or first or second derivative thereof. Embodiments may modify detected gaze targets to produce modified, accuracy enhanced gaze target information comprising positions of selected gaze targets.

FIG. 1 is a diagram illustrating an example head mounted device being worn by a user, arranged in accordance with at least some embodiments of the present disclosure. FIG. 1 illustrates a user 150, a head mounted device 100 being worn by user 150, a detected gaze target 141, and a selected gaze target 142. Head mounted device 100 includes a computer 101, a digital camera 102, and an eye-facing sensor 103. Head mounted device 100 also includes a lens or other view optics 110, although view optics 110 may be omitted (not included) in some embodiments. In FIG. 1, eye-facing sensor 103 may be adapted to detect real time gaze direction information for an eye of user 150. Digital camera 102 may be oriented to capture real time digital scene information from a scene visible by at least one eye of user 150, e.g., a scene comprising detected gaze target 141 and selected gaze target 142. An example scene is illustrated in FIG. 2.

Figure 2:
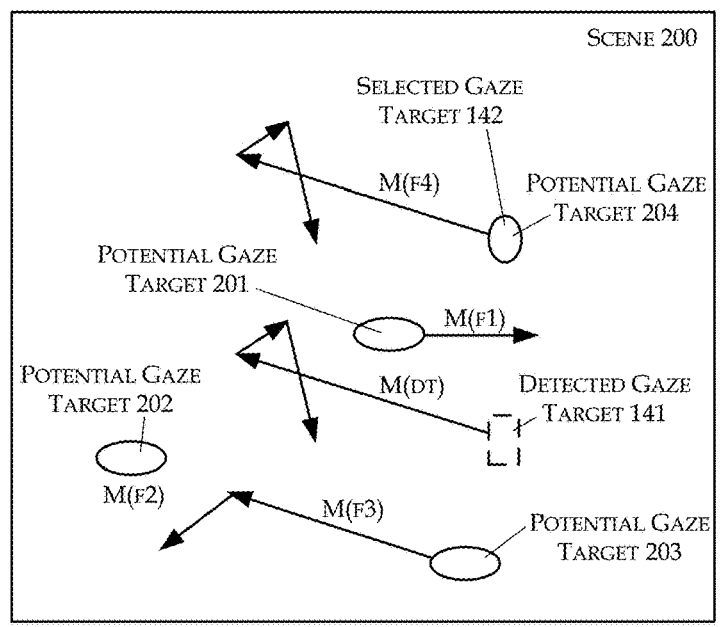
FIG. 2 is a diagram illustrating a scene comprising potential gaze targets, a detected gaze target, and motion thereof.

FIG. 2 is a diagram illustrating a scene comprising potential gaze targets, a detected gaze target, and motion thereof, arranged in accordance with at least some embodiments of the present disclosure. FIG. 2 illustrates a scene 200, e.g., which may be captured as real time video by digital camera 102. Scene 200 comprises a potential gaze target 201, a potential gaze target 202, a potential gaze target 203, and a potential gaze target 204.

Potential gaze target 201 may have a motion M(F1), illustrated by a motion vector extending from potential gaze target 201. Potential gaze target 201 is an example moving gaze target within scene 200, and potential gaze target 201 may, for example, exhibit a relatively constant velocity and no acceleration. Potential gaze target 202 may have a motion M(F2). Potential gaze target 202 is an example stationary gaze target within scene 200, and potential gaze target 202 may exhibit substantially no velocity or acceleration. Potential gaze target 203 may have a motion M(F3), and potential gaze target 204 may have a motion M(F4). Potential gaze targets 203-204 are example accelerating gaze targets within scene 200, and potential gaze targets 203-204 may exhibit changing velocities.

Four potential gaze targets 201-204 are illustrated at example positions, and with example motions, within scene 200. However, scenes may comprise any number of potential gaze targets, at any positions and exhibiting any motions, as will be appreciated. The term "motion" as used herein refers to velocity, acceleration, or both.

FIG. 2 also illustrates detected gaze target 141, at an example gaze target position within scene 200 and exhibiting an example detected target motion M(DT), illustrated by motion vectors extending from detected gaze target 141. M(DT) may exhibit, e.g., acceleration within scene 200 comprising changing velocity according the illustrated motion vectors. Detected gaze target 141 is not part of scene 200 as captured by digital camera 102, however, detected gaze target 141 position and motion within scene 200 may be derived from real time gaze direction information detected at eye-facing sensor 103. FIG. 2 also illustrates selected gaze target 142 within scene 200, wherein computer 101 may, for example, select potential gaze target 204 as selected gaze target 142.

Computer 101 may be equipped with an eye tracking accuracy enhancer stored in the memory and executable by the processor, e.g., as described in connection with FIG. 3. In some embodiments, the eye tracking accuracy enhancer may be configured to: receive real time gaze direction information from eye-facing sensor 103; receive real-time digital scene information (e.g., from scene 200) from digital camera 102; determine, based on the gaze direction information from eye-facing sensor 103, detected gaze target 141 within the real time digital scene information from scene 200, e.g., by determining detected gaze target 141 position, velocity and/or acceleration within scene 200; analyze the real time digital scene information from scene 200 to identify potential gaze targets 201-204; select potential gaze target 204 among the identified potential gaze targets 201-204; and modify the detected gaze target 141 to comprise at least position(s) of selected gaze target 142. Once selected gaze target 142 is established, selected gaze target 142 may be used for any of a wide range of applications, e.g., determining AR information for display and/or applying selected gaze target 142 as a user input to control functions of computer 101.

In some embodiments, determining detected gaze target 141 within the real time digital scene information from scene 200 based on the gaze direction information from eye-facing sensor 103 may comprise applying mathematical principles of trigonometry, geometry, etc., to project detected gaze directions onto scene 200. For example, computer 101 may calculate x, y coordinates of detected gaze target 141, in a coordinate system having a center point (x=0, y=0) at the center of scene 200. Embodiments may use, e.g., tangent or cotangent functions, or mathematical equivalents thereof, wherein x and y components $\theta_x$ and $\theta_y$ of detected gaze direction information may be used along with a known adjacent triangle leg distance D, e.g., a distance from an eye of user 150 to view optics 110, to solve for each of x and y, respectively. In some embodiments, determining detected gaze target 141 within the real time digital scene information from scene 200 based on the gaze direction information from eye-facing sensor 103 may be accomplished using a list of gaze directions, e.g., eye angles, and corresponding gaze target positions, wherein embodiments may look up gaze target positions corresponding to detected gaze directions. Embodiments may furthermore determine gaze target velocities and/or accelerations based on, e.g., gaze target vector histories derived from gaze target positions across multiple video frames captured from scene 200.

In some embodiments, gaze target velocities and/or accelerations may be compared using an eye mechanical model simulator. The motion of the human eye is approximately a second order spring-mass system driven by a feedback loop that has built in delay. This may manifest as visible rise times that lag accelerating objects and overshoot when targets change speed. Thus, for example, M(DT) within scene 200 may be adjusted by operation of an eye mechanical model simulator to reflect likely motion of a potential gaze target watched by user 150, rather than using a "raw" M(DT) function which strictly applies detected gaze direction for comparison.

As described herein, some embodiments may operate in the eye direction coordinate space, rather than the captured scene coordinate space. For example, instead of determining detected gaze target 141 within scene 200, embodiments may determine expected gaze directions associated with potential gaze targets 201-204. Such embodiments may also make use of an eye mechanical model simulator, e.g., to simulate expected eye movements to follow each of potential gaze targets 201-204, complete with lag, overshoot, and/or other mechanical artifacts. Regardless of technical approach, embodiments may compare eye tracking information from eye-facing sensor 103, and changes thereof, with positions, velocities, and/or accelerations of potential gaze targets 201-204 to select a potential gaze target within scene 200 which user 150 may be most likely watching.

Computer 101 may apply of a variety of algorithms to identify potential gaze targets 201-204 in image or video data within scene 200, such as, by way of example, SURF, SIFT, and/or KLT type algorithms as disclosed herein. In some embodiments, computer 101 may apply object recognition to analyze digital scene information from scene 200 and to thereby identify objects which may be potential gaze targets 201-204. In some embodiments, computer 101 may analyze digital scene information from scene 200 at least in part by identifying sets of related graphical features, each set of related graphical features comprising, e.g., a potential gaze target, such as one of potential gaze targets 201-204.

Computer 101 may select selected gaze target 142 from among potential gaze targets 201-204, e.g., by comparing detected gaze target 141 position, velocity, and/or acceleration with positions, velocities, and/or accelerations of potential gaze targets 201-204. For example, in some embodiments, selected gaze target 142 may have a feature position, within the digital scene information from scene 200, which may be within an error boundary surrounding detected gaze target 141. Error boundaries may depend on the accuracy of eye-facing sensor 103, alignment between camera image and eye, and/or calculations used to map detected gaze target 141 onto scene 200. Error boundaries may define a zone surrounding detected gaze target 141 within which detected gaze target 141 may be modified. In some embodiments, selected gaze target 142 may furthermore comprise a moving gaze target having a gaze target velocity that substantially matches detected gaze target 141 velocity. In some embodiments, selected gaze target 142 may furthermore comprise an accelerating gaze target having a gaze target acceleration that substantially matches detected gaze target 141 acceleration.

In some potential real world scenarios, several potential gaze targets may exhibit positions within gaze target error boundaries, as well as velocities and/or accelerations at least similar to detected gaze target velocities and/or accelerations. Embodiments may therefore apply techniques to select an appropriate potential gaze target from among several possible candidates. Computer 101 may, for example, dynamically assign weights to multiple potential gaze targets 201-204. Computer 101 may use the dynamically assigned weights to select a potential gaze target. For example, computer 101 may assign weights to each of potential gaze targets 201-204 according to their proximities to detected gaze target 141, with stronger weights being applied to more closely proximal potential gaze targets. Computer 101 may assign weights to each of potential gaze targets 201-204 according degree of match between potential gaze target velocities and/or accelerations and velocity and/or acceleration of detected gaze target 141, with stronger weights being applied to potential gaze targets having more closely matching velocities and/or accelerations. A strongest weighted potential gaze target may then be selected as selected gaze target 142.

In some embodiments, acceleration matches may be associated with a relatively stronger range of weights, while velocity matches may be associated with an intermediate range weights, and position matches may be associated with a relatively weaker range weights. Computer 101 may thereby increase accuracy of potential gaze target selection when potential gaze targets exhibit motions matching those of detected gaze target 141.

In some embodiments, computer 101 may process real time gaze direction information from eye-facing sensor 103 and real time digital scene information from digital camera 102 in real time to continuously output selected gaze targets such as selected gaze target 142 in real time, as the real time gaze direction information and real time digital scene information are received at computer 101. It will be appreciated that in other embodiments, computer 101 may store and process received gaze direction information and digital scene information at a later time, i.e., not in real time, to determine selected gaze targets which may nonetheless prove useful for other than real time applications.

In some embodiments, digital camera 102 may be adapted to capture video at multiple different frame rates or resolutions. For example, digital camera 102 may have a default frame rate and/or a default resolution, however computer 101 may be adapted to adjust digital camera 102 default settings to operate digital camera 102 at other frame rates and/or resolutions. Computer 101 may be adapted to adjust digital camera 102 frame rates and/or resolutions as appropriate for use in connection with capturing digital scene information according to this disclosure. For example, computer 101 may be adapted to preserve battery life of head mounted device 100 by operating digital camera 102 at a reduced frame rate and/or a reduced resolution, e.g., a frame rate or resolution lower than the default frame rate or resolution. In applications where power is not limiting and/or accuracy is paramount, computer 101 may be adapted to operate digital camera 102 at an enhanced frame rate and/or an enhanced resolution e.g., a frame rate or resolution higher than the default frame rate or resolution. In some embodiments, computer 101 may be adapted to vary the frame rate and/or resolution according to the speed and frequency of movement of the user's eye and/or the speed and frequency of movement of the environment or potential gaze targets therein.

Figure 3:
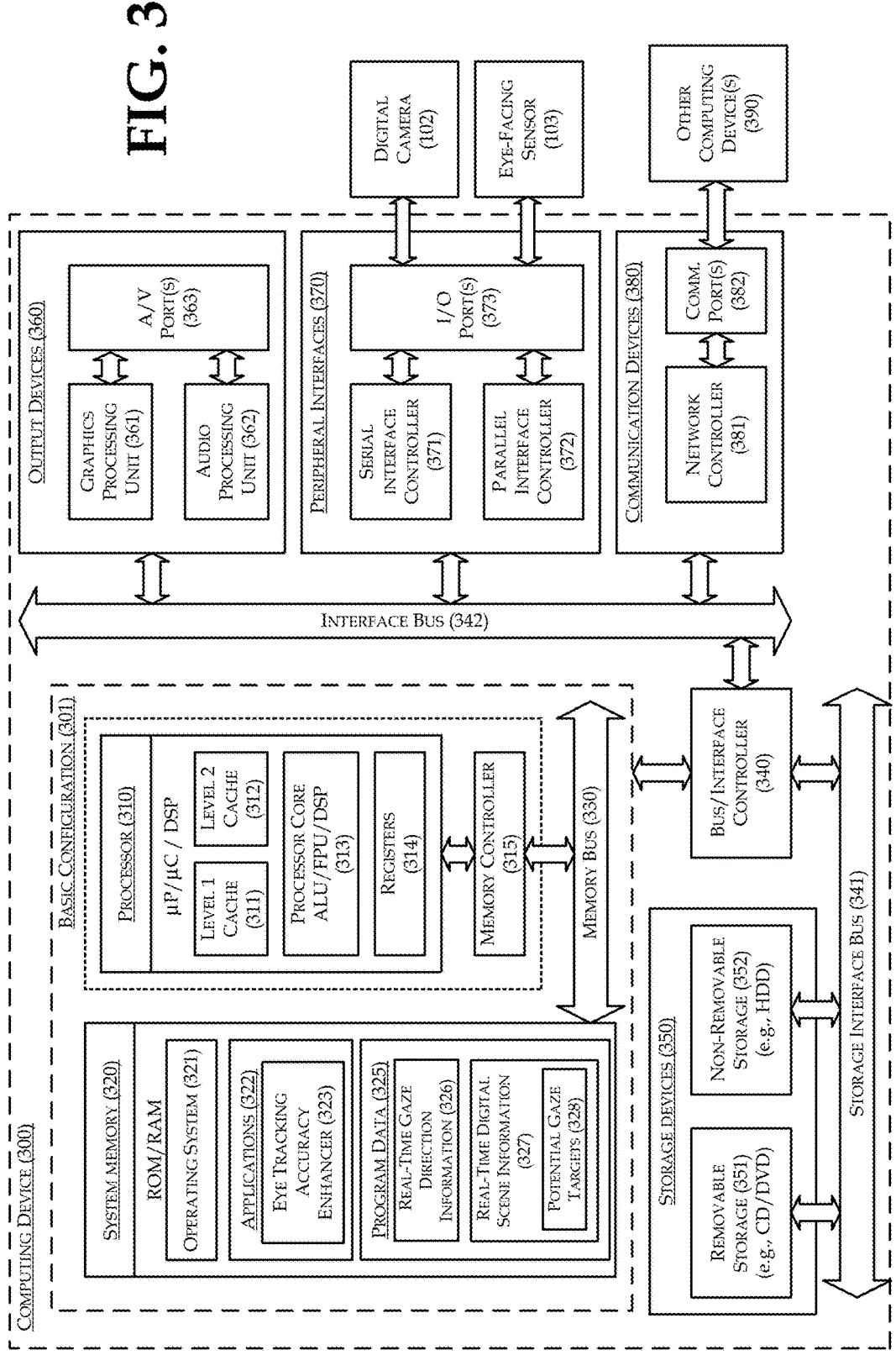
FIG. 3 is a block diagram of a computing device as one example of computer incorporated within a head mounted device.

FIG. 3 is a block diagram of a computing device as one example of computer incorporated within a head mounted device, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (μP), a microcontroller (μC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 325. In some embodiments, operating system 321 may comprise a virtual machine that is managed by a Virtual Machine Manager (VMM). Applications 322 may include, for example, eye tracking accuracy enhancer module(s) 323 as described herein. Program data 325 may include real time gaze direction information 326, e.g., as may be received from eye-facing sensor 103, real time digital scene information 327, e.g., as may be received from digital camera 102, and potential gaze targets 328 that may extracted from real time digital scene information 327, respectively.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disc drives such as compact disc (CD) drives or digital versatile disc (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, level 2 cache 312, system memory 320, removable storage 351, and non-removable storage devices 352 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that may be used to store the desired information and that may be accessed by computing device 300. Any such computer storage media may be part of computing device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more AN ports 363. Example peripheral interfaces 370 may include a serial interface controller 371 or a parallel interface controller 372, which may be configured to communicate through either wired or wireless connections with devices such as digital camera 102, eye-facing sensor 103, and/or other input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a computer integrated within a head mounted device such as illustrated in FIG. 1. Computing device 300 may also be implemented as a computer external to a head mounted device such as illustrated in FIG. 1, but nonetheless in wired or wireless communication with such a head mounted device so as to receive real time gaze direction information 326 and real time digital scene information therefrom. For example, computing device 300 may be implemented as a personal or business use computer including both laptop computer and non-laptop computer configurations, or a server in a data center. Embodiments in which computing device 300 operates other than in real time, using gaze direction information and digital scene information which is not in real time, may also be designed according to this disclosure.

Figure 4:
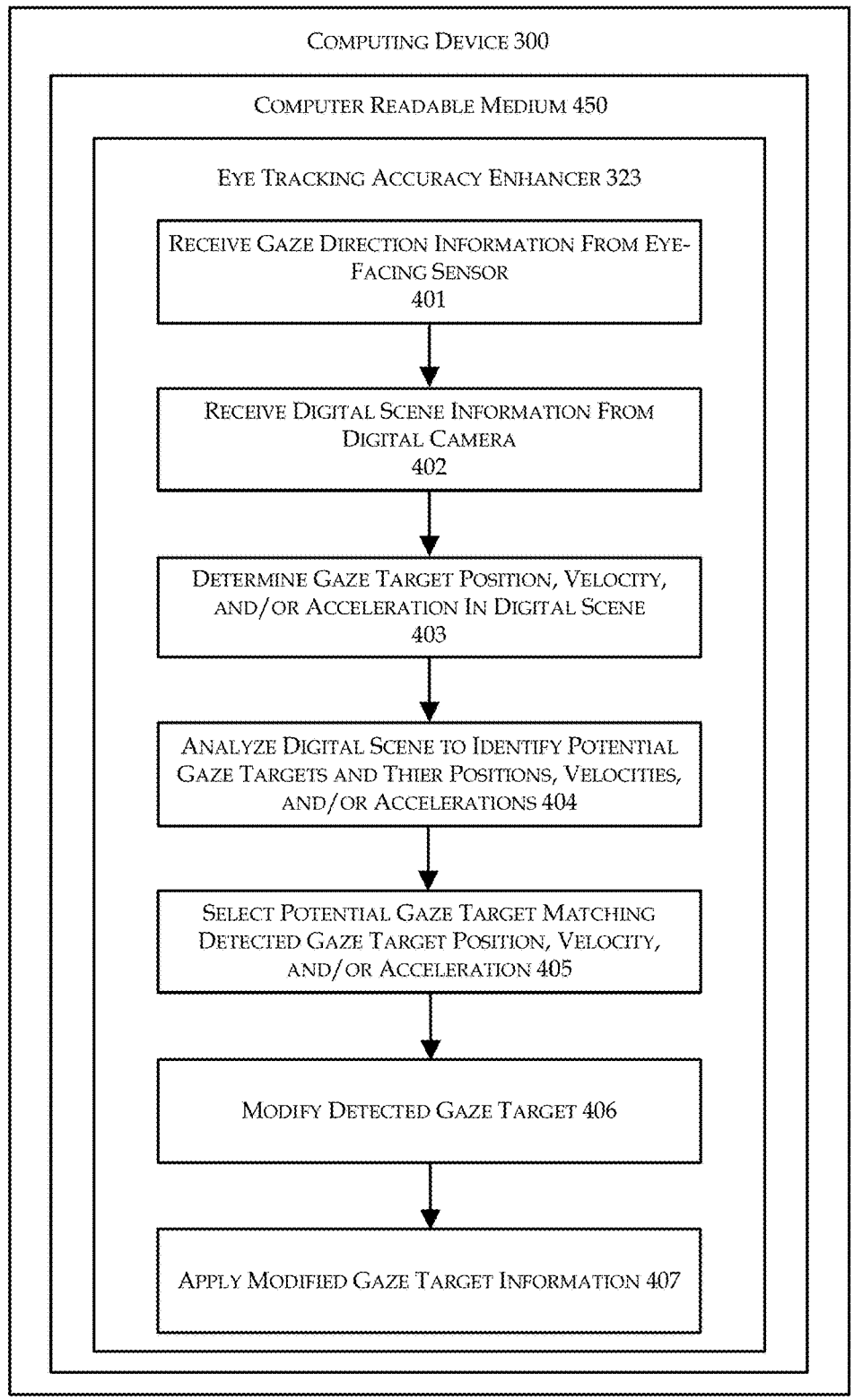
FIG. 4 is a flow diagram illustrating an example eye tracking method.

FIG. 4 is a flow diagram illustrating an example eye tracking method, arranged in accordance with at least some embodiments of the present disclosure. The example flow diagram may include one or more operations/modules as illustrated by blocks 401-407, which represent operations as may be performed in a method, functional modules in a computing device 300, and/or instructions as may be recorded on a computer readable medium 450.

In FIG. 4, blocks 401-407 are illustrated as including blocks being performed sequentially, e.g., with block 401 first and block 407 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300 may conduct eye tracking, in which eye tracking data from an eye-facing sensor may be improved to increase accuracy thereof, by performing scene analysis, selection of potential gaze targets, and modifications of eye tracking data.

At a "Receive Gaze Direction Information From Eye-Facing Sensor" block 401, computing device 300 may receive gaze direction information for at least one eye, e.g., an eye of user 150, from eye-facing sensor 103. Computing devices comprising integrated eye-facing sensors may receive gaze direction information from the integrated eye-facing sensors. Computing devices communicatively coupled with external eye-facing sensors may receive gaze direction information from the external eye-facing sensors, optionally via any number of intermediate devices or network infrastructure. Block 401 may be followed by block 402.

At a "Receive Digital Scene Information From Digital Camera" block 402, computing device 300 may receive digital scene information from digital camera 102. Digital camera 102 may be oriented to capture the digital scene information from a scene visible by the eye of user 150 which may be tracked at block 401. Computing devices comprising integrated digital cameras may receive digital scene information from the integrated digital cameras. Computing devices communicatively coupled with external digital cameras may receive digital scene information from the external digital cameras, optionally via any number of intermediate devices or network infrastructure. In some embodiments, computing device 300 may adjust a frame rate and/or a resolution of digital camera 102 at block 402, e.g., digital camera 102 may have a default frame rate or a default resolution, and computing device 300 may operate digital camera 102 at a different frame rate and/or a different resolution. Block 402 may be followed by block 403.

At a "Determine Gaze Target Position, Velocity, And/Or Acceleration In Digital Scene" block 403, computing device 300 may determine, based on the gaze direction information received at block 401, a gaze target within the digital scene information received at block 402. Determining a gaze target may comprise, e.g., determining gaze targets in multiple different video frames and calculating corresponding first and/or second derivatives to determine gaze target vector histories including gaze target positions, velocities, and/or accelerations. In some embodiments, determining a gaze target may comprise applying an eye mechanical model simulator to simulate movement of an object within the digital scene information received at block 402, based on detected eye movements. Some embodiments may omit gaze target determinations, and may instead calculate, e.g., eye angular directions, eye angular velocities and eye angular accelerations for use in comparisons in an eye coordinate space, e.g., as may be conducted at block 405. Block 403 may be followed by block 404.

At an "Analyze Digital Scene to Identify Potential Gaze Targets and Their Positions, Velocities, And/Or Accelerations" block 404, computing device 300 may analyze the digital scene information received at block 402 to identify potential gaze targets therein. For example, computing device 300 may apply object recognition and/or graphics analysis algorithms to digital scene information received at block 402 as disclosed herein. Identified potential gaze targets may comprise, e.g., stationary gaze targets, moving and/or accelerating gaze targets. Computing device 300 may trace positions of potential gaze targets across multiple different video frames and may calculate corresponding first and/or second derivatives to determine potential gaze target positions, velocities, and/or accelerations. In some embodiments, potential gaze target positions, velocities, and/or accelerations may be translated into, e.g., an angular coordinate system or eye coordinate space used for gaze direction in gaze direction information received at block 401. An eye mechanical model simulator may be used to simulate movement of an eye based on potential gaze target positions, velocities, and/or accelerations. Block 404 may be followed by block 405.

At a "Select Potential Gaze Target Matching Detected Gaze Target Position, Velocity, And/Or Acceleration" block 405, computing device 300 may select a feature among the features identified at block 404. In some embodiments, computing device 300 may select a potential gaze target that may have a position, as determined at block 404, which may be within an error boundary surrounding the detected gaze target, as determined at block 403. In some embodiments, multiple detected gaze target positions may optionally be compared against multiple potential gaze target positions associated with an identified potential gaze target, across multiple video frames received at block 402. In some embodiments, computing device 300 may select a potential gaze target that has a velocity that substantially matches a detected gaze target velocity, including, e.g., substantially matching speed and direction. In some embodiments, computing device 300 may select a potential gaze target that has an acceleration that substantially matches a detected gaze target acceleration including, e.g., substantially matching magnitude and direction of acceleration. In some embodiments, computing device 300 may dynamically assign weights to a plurality of potential gaze targets identified at block 404, as described herein, and computing device 300 may use the dynamically assigned weights to select a potential gaze target. Block 405 may be followed by block 406.

At a "Modify Detected Gaze Target" block 406, computing device 300 may modify the detected gaze target, including positions, velocities, and/or accelerations thereof, e.g., as determined at block 403, to comprise positions, velocities, and/or accelerations of the selected gaze target, selected at block 405. In some embodiments, the modified gaze target information may be stored or transmitted to another computer for storage and/or further analysis. In some embodiments, information describing the potential gaze target selected at block 405 may be stored or transmitted along with the modified gaze target information, e.g., a snapshot of the selected gaze target, or text identifying an object or identifying, e.g., an advertisement within the selected gaze target, may be stored or transmitted along with the modified gaze target information. Block 406 may be followed by block 407.

At an "Apply Modified Gaze Target Information" block 407, computing device 300 may apply modified gaze target information from block 406 in connection with any application for which eye tracking information may be used. For example, computing device 300 may use modified gaze target information from block 406 to determine AR information for display, such as, by way of example, information identifying, describing, or otherwise associated with an object at the modified gaze target. In another example, computing device 300 may apply the modified gaze target information from block 406 as a user input to control at least one computing device function. A wide variety of other applications are possible as will be appreciated and this disclosure is not limited to any particular application.

In some embodiments, blocks 401-406, and optionally also block 407, may be performed by computing device 300 in real time, that is, the gaze direction information and the digital scene information received at blocks 401 and 402, respectively, may comprise real time gaze direction information and real time digital scene information. Computing device 300 may furthermore perform blocks 403-407 in real time as the real time gaze direction information and real time digital scene information are received.

Figure 5:
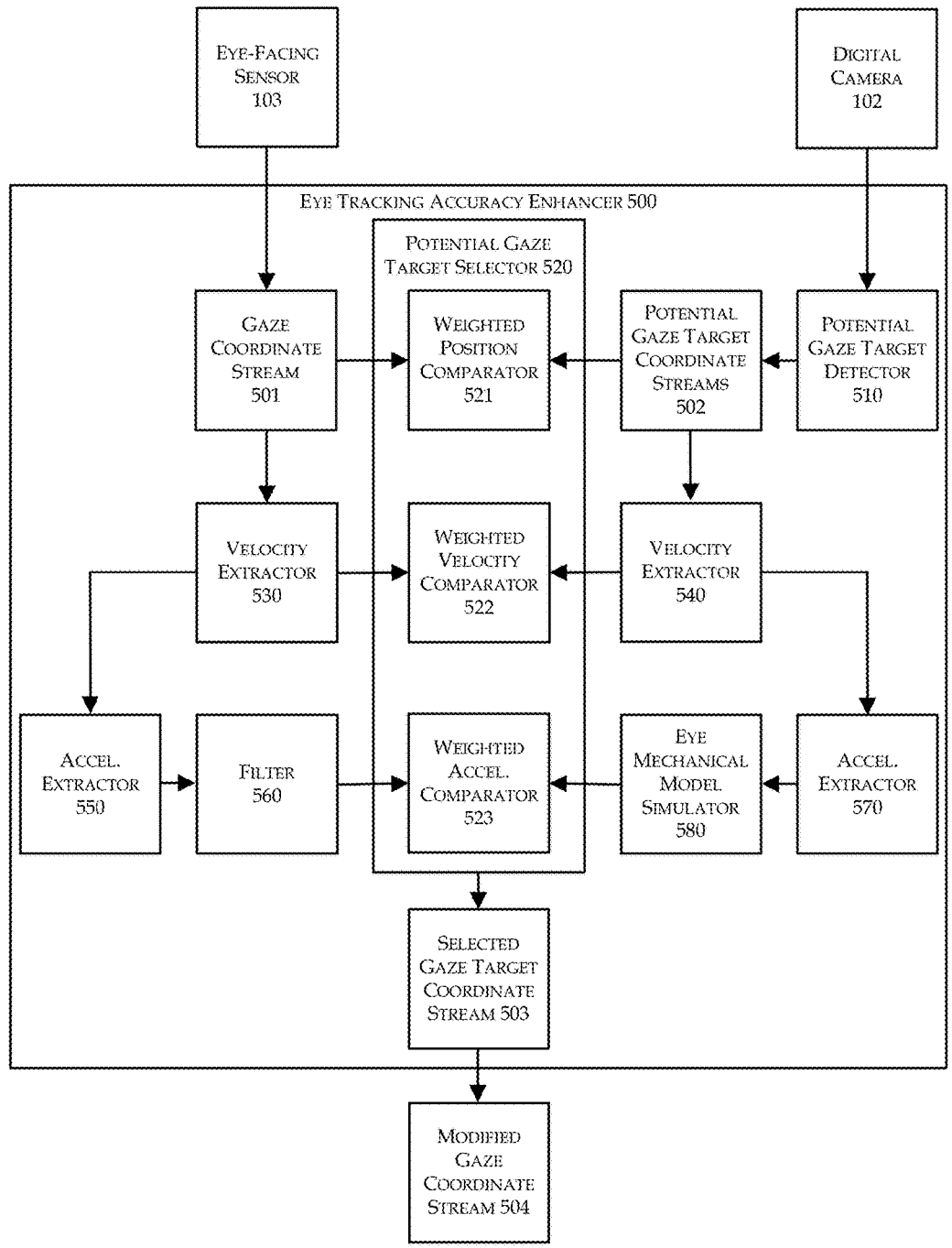
FIG. 5 is a block diagram illustrating an example eye tracking accuracy enhancer.

FIG. 5 is a block diagram illustrating an example eye tracking accuracy enhancer, arranged in accordance with at least some embodiments of the present disclosure. FIG. 5 illustrates an eye tracking accuracy enhancer 500, which may serve as an alternative arrangement for eye tracking accuracy enhancer 323 as described in connection with FIG. 3 and FIG. 4. Eye tracking accuracy enhancer 500 includes a potential gaze target detector 510, a potential gaze target selector 520, a velocity extractor 530 and a velocity extractor 540, an acceleration extractor 550, a filter 560, an acceleration extractor 570, and an eye mechanical model simulator 580. Potential gaze target selector 520 includes a weighted position comparator 521, a weighted velocity comparator 522, and a weighted acceleration comparator 523.

In FIG. 5, potential gaze target selector 520 may receive a gaze coordinate stream 501 as an input, wherein gaze coordinate stream 501 may comprise, or may be derived from, an output from eye-facing sensor 103. Potential gaze target selector 520 may also receive potential gaze target coordinate streams 502 as an input, wherein potential gaze target coordinate streams 502 may comprise, or may be derived from, an output from potential gaze target detector 510, which analyzes digital scene information from digital camera 102 to identify potential gaze targets and extract corresponding potential gaze target coordinate streams 502. Potential gaze target selector 520 may produce a selected gaze target coordinate stream 503 as an output, and eye tracking accuracy enhancer 500 may apply selected gaze target coordinate stream 503 as modified gaze coordinate stream 504.

In some embodiments, potential gaze target detector 510 may analyze a video stream received from digital camera 102 to extract potential gaze targets therefrom. Potential gaze target detector 510 may supply potential gaze target coordinate streams 502, comprising a stream of position coordinates for each identified potential gaze target. Eye tracking accuracy enhancer 500 may optionally translate potential gaze target coordinate streams 502 into any desired coordinate space, as described herein. Meanwhile, eye tracking accuracy enhancer 500 may also translate gaze coordinate stream 501 into a same coordinate space as that of potential gaze target coordinate streams 502. Gaze coordinate stream 501 may comprise a stream of position coordinates for an eye which is tracked.

In some embodiments, weighted position comparator 521 may compare position coordinates in each of potential gaze target coordinate streams 502 with position coordinates in gaze coordinate stream 501. Weighted position comparator 521 may assign each identified potential gaze target a weight based on proximity of its corresponding potential gaze target coordinate stream with the position coordinates in gaze coordinate stream 501. Weighted position comparator 521 may assign stronger weights to identified potential gaze targets having coordinate streams in closer proximity to gaze coordinate stream 501. In some embodiments, gaze coordinate stream 501 and potential gaze target coordinate streams 502 may include time information, and weighted position comparator 521 may be adapted to compare position coordinates at multiple different points in time. In some embodiments, weighted position comparator 521 may be adapted to eliminate identified potential gaze targets having coordinate streams comprising position coordinates substantially outside an error boundary for gaze coordinate stream 501. Eliminated potential gaze targets may be temporarily removed as candidates for a current selection operation by eye tracking accuracy enhancer 500.

In some embodiments, velocity extractor 530 may be adapted to calculate a first time derivative d/dt of gaze coordinate stream 501 to thereby compute gaze velocity. Similarly, velocity extractor 540 may be adapted to calculate first time derivatives d/dt of each of potential gaze target coordinate streams 502 to compute velocity for each identified potential gaze target, other than those identified potential gaze targets which may be eliminated from the current selection operation by weighted position comparator 521.

Weighted velocity comparator 522 may be adapted to compare calculated velocities of each of potential gaze target coordinate streams 502 with calculated velocity of gaze coordinate stream 501. Weighted velocity comparator 522 may assign each identified potential gaze target a weight based on degree of match between its calculated velocity and the calculated velocity of gaze coordinate stream 501. Weighted velocity comparator 522 may assign stronger weights to identified potential gaze targets having more closely matching velocities to that of gaze coordinate stream 501. In some embodiments, weighted velocity comparator 522 may assign generally stronger weights, e.g., stronger than weights applied by weighted position comparator 521, to identified potential gaze targets having velocity that substantially matches eye velocity of gaze coordinate stream 501, while weighted velocity comparator 522 may otherwise assign little or no weight to identified potential gaze targets having velocity that does not substantially match that of gaze coordinate stream 501. Weighted velocity comparator 522 may be adapted to compare velocities at multiple different points in time. In some embodiments, weighted velocity comparator 522 may be adapted to eliminate identified potential gaze targets having velocities substantially different from a calculated velocity for gaze coordinate stream 501, such as, by way of example, velocities having substantially different directions, e.g., 90 degrees difference or more, or velocities having substantially different magnitudes, such as, by way of example, 50% of gaze velocity or less, or 200% of gaze velocity or more.

In some embodiments, acceleration extractor 550 may be adapted to calculate a second time derivative $d^2/dt^2$ of gaze coordinate stream 501 to compute gaze acceleration. Similarly, acceleration extractor 570 may be adapted to calculate second time derivatives $d^2/dt^2$ of each of potential gaze target coordinate streams 502 to compute acceleration for each identified potential gaze target, other than those identified potential gaze targets which may be eliminated from the current selection operation by weighted position comparator 521 and/or weighted velocity comparator 522.

Filter 560 may be adapted to filter calculated acceleration outputs from acceleration extractor 550. In some cases, acceleration outputs may prove too noisy for useful comparisons. Filter 560 may smooth acceleration outputs, e.g., to eliminate certain fast-back-and forth type eye accelerations and/or to capture broader eye acceleration information while eliminating "jumpy" small scale and short time frame eye accelerations.

Eye mechanical model simulator 580 may be adapted to modify calculated accelerations for each of potential gaze target coordinate streams 502 by simulating eye accelerations for a hypothetical eye following corresponding identified potential gaze targets. In some embodiments, eye mechanical model simulator 580 may, for example, inject lag and overshoot motion into calculated accelerations for each of potential gaze target coordinate streams 502. In some embodiments, an eye mechanical model simulator may be placed between velocity extractor 540 and weighted velocity comparator 522 and/or between potential gaze target coordinate streams 502 and weighted position comparator 521, instead of or in addition to eye mechanical model simulator 580 between acceleration extractor 570 and weighted acceleration comparator 523.

Weighted acceleration comparator 523 may be adapted to compare calculated accelerations of each of potential gaze target coordinate streams 502, as optionally modified by eye mechanical model simulator 580, with calculated acceleration of gaze coordinate stream 501, as optionally modified by filter 560. Weighted acceleration comparator 523 may assign each identified potential gaze target a weight based on degree of match between its calculated acceleration and the calculated acceleration of gaze coordinate stream 501. Weighted acceleration comparator 523 may assign stronger weights to identified potential gaze targets having more closely matching acceleration to that of gaze coordinate stream 501. In some embodiments, weighted acceleration comparator 523 may assign very strong weights, e.g., stronger than weights applied by weighted position comparator 521 and/or weighted velocity comparator 522, to identified potential gaze targets having substantially matching acceleration to that of gaze coordinate stream 501, while weighted acceleration comparator 523 may otherwise assign little or no weight to identified potential gaze targets having acceleration that does not substantially match that of gaze coordinate stream 501. Weighted acceleration comparator 523 may be adapted to compare acceleration at multiple different points in time.

In some embodiments, potential gaze target selector 520 may be adapted to aggregate, for each identified potential gaze target, the weights applied by each of weighted position comparator 521, weighted velocity comparator 522, and/or weighted acceleration comparator 523. Potential gaze target selector 520 may select an identified potential gaze target having a strongest aggregate weight. Potential gaze target selector 520 may output selected gaze target coordinate stream 503, comprising, e.g., a coordinate stream from among potential gaze target coordinate streams 502 corresponding to the selected gaze target. In some embodiments, selected gaze target coordinate stream 503 may dynamically switch among different selected gaze target coordinate streams, in real time, as different identified potential gaze targets are dynamically selected by potential gaze target selector 520 based on changes in gaze coordinate stream 501. Eye tracking accuracy enhancer 500 may store, transmit, or otherwise apply selected gaze target coordinate stream 503 as modified gaze coordinate stream 504.

Figure 6:
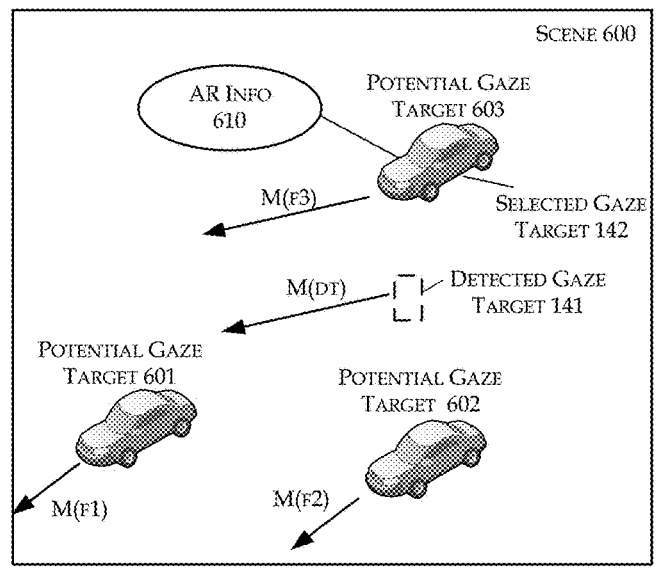
FIG. 6 is a diagram illustrating a scene comprising potential gaze targets, a detected gaze target, a selected gaze target, and AR information for the selected gaze target.

FIG. 6 is a diagram illustrating a scene comprising potential gaze targets, a detected gaze target, a selected gaze target, and AR information for the selected gaze target, arranged in accordance with at least some embodiments of the present disclosure. FIG. 6 illustrates a scene 600. Scene 600 includes a potential gaze target 601 exhibiting a motion M(F1), a potential gaze target 602 exhibiting a motion M(F2), and a potential gaze target 603 exhibiting a motion M(F3). Detected gaze target 141 may exhibit motion M(DT). Potential gaze targets 601-603, detected gaze target 141, and motions thereof may be acquired as disclosed herein, and potential gaze target 603 may be selected as selected gaze target 142 according to the techniques disclosed herein.

In FIG. 6, a computing device, such as computing device 300, may determine AR information 610 for selected gaze target 142. For example, when a user of computing device 300 is watching an automobile race, computing device 300 may display AR information identifying the automobile at selected gaze target 142, optionally along with speed, driver, or other information for the automobile. Such AR information may be retrieved from information stored locally at computing device 300 and/or from a computer network, using information derived from scene 600 to identify the automobile at selected gaze target 142.

Figure 7:
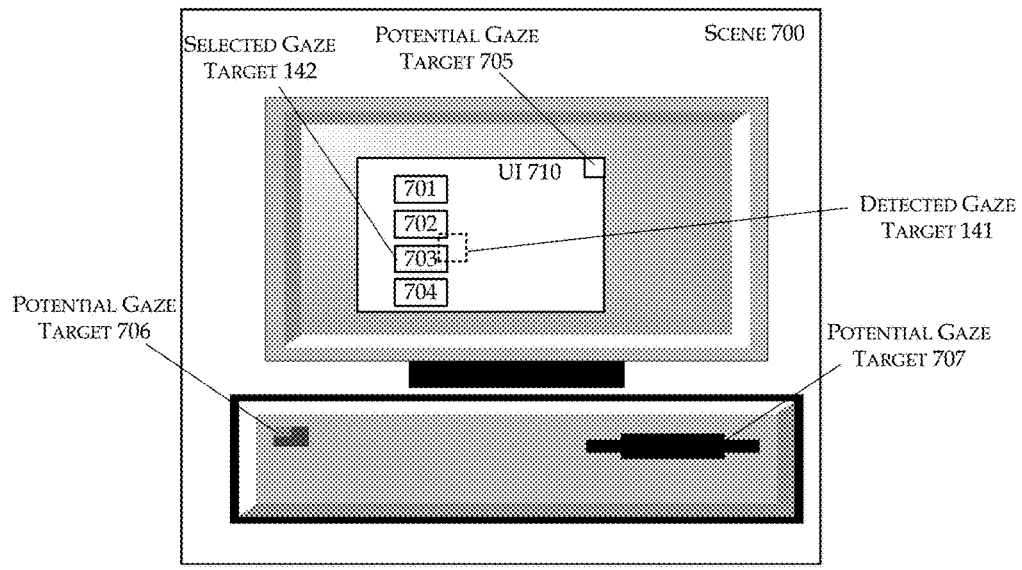
FIG. 7 is a diagram illustrating a scene comprising potential gaze targets, a detected gaze target, and a selected gaze target, wherein the selected gaze target may be applied as a user input to control at least one computing device function, all arranged in accordance with at least some embodiments of the present disclosure.

FIG. 7 is a diagram illustrating a scene comprising potential gaze targets, a detected gaze target, and a selected gaze target, wherein the selected gaze target may be applied as a user input to control at least one computing device function, arranged in accordance with at least some embodiments of the present disclosure. FIG. 7 illustrates a scene 700. Scene 700 includes a potential gaze target 701, a potential gaze target 702, a potential gaze target 703, a potential gaze target 704, a potential gaze target 705, a potential gaze target 706, and a potential gaze target 707, wherein potential gaze targets 701-705 are within a UI displayed at a computing device display. Potential gaze targets 706 and 707 comprise, e.g., other potential gaze targets identified within scene 700. Potential gaze targets 701-707 and detected gaze target 141 may be acquired as disclosed herein, and potential gaze target 703 may be selected as selected gaze target 142 according to the techniques disclosed herein. Eye tracking matching may be useful to match eye motion to motion in the visual field of even stationary objects because user head motion may cause stationary objects to change position in the eye coordinate system.

In FIG. 7, a computing device such as computing device 300 may apply selected gaze target 142 as a user input to control computing device functions, e.g., a function of the computing device in scene 700. Computing device 300 may, for example, send to the computing device in scene 700 a command to select the UI element at potential gaze target 703. Computing device 300 may be adapted to recognize the computing device in scene 700, as well as UI 710 and potential gaze targets thereof, to allow computing device 300 to send an appropriate UI command to the computing device in scene 700. Alternatively, computing device 300 may be configured in advance, e.g., by a user, to recognize UI 710 and the various controls thereof, and to communicate with the computing device in scene 700. In some embodiments, computing device 300 may replicate functions of UI 710 at computing device 300 to optionally control functions of computing device 300.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disc (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. An eye tracking method comprising:
receiving, by a computation device, gaze direction information for at least one eye from an eye-facing sensor;
detecting, by the computation device based on the gaze direction information, a gaze target corresponding to a scene visible to the at least one eye;
determining, by the computation device based on the gaze direction information position and motion information of the detected gaze target;
receiving, by the computation device from a digital camera, digital scene information, wherein the digital camera is oriented to capture the digital scene information from the scene visible to the at least one eye;
analyzing, by the computation device, the digital scene information to identify one or more potential gaze targets within the digital scene information, wherein the one or more potential gaze targets correspond to one or more objects in the scene visible to the at least one eye;
determining, by the computation device based on the analysis of the digital scene information, respective position and motion information of the one or more potential gaze targets within the digital scene information;
comparing, by the computation device, the position and motion information of the detected gaze target with the respective position and motion information of the one or more potential gaze targets to select a gaze target from among the one or more potential gaze targets;
modifying, by the computation device, the position and motion information of the detected gaze target to correspond to position and motion information of the selected gaze target, so as to correct the detected gaze target to correspond to the selected gaze target, wherein the selected gaze target is positioned as an object in the scene visible to the at least one eye and qualifies as a user input for the computation device, and wherein the detected gaze target does not qualify as a user input for the computation device; and
applying, by the computation device, the selected gaze target as the user input to perform at least one function associated with the computation device.

2. The eye tracking method of claim 1, wherein the gaze direction information comprises angular coordinates.

3. The eye tracking method of claim 1, wherein an estimated gaze direction corresponding to the selected gaze target is within an error boundary that surrounds the gaze direction information received from the eye-facing sensor.

4. The eye tracking method of claim 1, wherein analyzing the digital scene information to identify the one or more potential gaze targets within the digital scene information comprises performing object recognition within the digital scene information to thereby determine the one or more potential gaze targets comprising recognized objects.

5. The eye tracking method of claim 1, wherein analyzing the digital scene information to identify the one or more potential gaze targets within the digital scene information comprises identifying one or more sets of related graphical features within the digital scene information to determine the one or more potential gaze targets comprising sets of related graphical features.

6. The eye tracking method of claim 1, wherein the one or more potential gaze targets comprise one or more of:
a stationary gaze target within the digital scene informational,
a moving gaze target within the digital scene information, or
an accelerating gaze target within the digital scene information.

7. The eye tracking method of claim 6, further comprising:
modeling by the computation device, eye motions associated with following the moving gaze target or the accelerating gaze target in the scene visible to the at least one eye; and
comparing, by the computation device, modeled eye motions with eye motion detected at the eye-facing sensor to select the gaze target from among the one or more potential gaze targets.

8. The eye tracking method of claim 7, wherein modeling the eye motions associated with following the moving gaze target or the accelerating gaze target in the scene visible to the at least one eye comprises applying an eye mechanical model simulator.

9. The eye tracking method of claim 1, wherein selecting the gaze target from among the one or more potential gaze targets comprises dynamically assigning weights to a plurality of the one or more potential gaze targets, and using the dynamically assigned weights to select the gaze target.

10. The eye tracking method of claim 1, further comprising determining, by the computation device based on the selected gaze target, augmented reality information for display.

11. The eye tracking method of claim 1, wherein the digital camera has one or more of a default frame rate or a default resolution, and wherein the eye tracking method further comprises:
operating, by the computation device, the digital camera at one or more of a reduced frame rate, a reduced resolution, an enhanced frame rate, or an enhanced resolution, to capture the digital scene information, wherein the reduced frame rate is lower than the default frame rate, wherein the reduced resolution is lower than the default resolution, wherein the enhanced frame rate is higher than the default frame rate, and wherein the enhanced resolution is higher than the default resolution.

12. The eye tracking method of claim 1, wherein the gaze direction information and the digital scene information, respectively, comprise real time gaze direction information and real time digital scene information, and wherein the eye tracking method further comprises:
modifying the selected gaze target in real time as the real time gaze direction information and real time digital scene information are received.

13. An eye tracking computation device, comprising:
a processor;
a memory; and
an eye tracker stored in the memory and executable by the processor, wherein the eye tracker is configured to perform operations that comprise:
receive gaze direction information for at least one eye from an eye-facing sensor;
detect, based on the gaze direction information, a gaze target corresponding to a scene visible to the at least one eye;
determine, based on the gaze direction information, position and motion information of the detected gaze target;
receive digital scene information from a digital camera, wherein the digital camera is oriented to capture the digital scene information from the scene visible to the at least one eye;
analyze the digital scene information to identify one or more potential gaze targets within the digital scene information, wherein the one or more potential gaze targets correspond to one or more objects in the scene visible to the at least one eye;
determine, based on the analysis of the digital scene information, respective position and motion information of the one or more potential gaze targets within the digital scene information;
compare the position and motion information of the detected gaze target with the respective position and motion information of the one or more potential gaze targets to select a gaze target from among the one or more potential gaze targets;
modify the position and motion information of the detected gaze target to correspond to position and motion information of the selected gaze target, so as to correct the detected gaze target to correspond to the selected gaze target, wherein the selected gaze target is positioned as an object in the scene visible to the at least one eye and qualifies as a user input for the eye tracking computation device, and
wherein the detected gaze target does not qualify as a user input for the eye tracking computation device; and
apply the selected gaze target as the user input to perform at least one function associated with the eye tracking computation device.

14. The eye tracking computation device of claim 13, wherein the gaze direction information comprises angular coordinates.

15. The eye tracking computation device of claim 13, wherein an estimated gaze direction corresponding to the selected gaze target is within an error boundary that surrounds the gaze direction information received from the eye-facing sensor.

16. The eye tracking computation device of claim 13, wherein the one or more potential gaze targets comprise one or more of:
a stationary gaze target within the digital scene informational,
a moving gaze target within the digital scene in formation, or an accelerating gaze target within the digital scene information.

17. The eye tracking computation device of claim 16, wherein the operations further comprise:
model eye motions associated with following the moving gaze target or the accelerating gaze target in the scene visible to the at least one eye; and
compare modeled eye motions with eye motion detected at the eye-facing sensor to select the gaze target from among the one or more potential gaze targets.

18. The eye tracking computation device of claim 17, wherein the operation to model the eye motions associated with following the moving gaze target or the accelerating gaze target in the scene visible to the at least one eye comprises at least one operation to apply an eye mechanical model simulator.

19. The eye tracking computation device of claim 13, wherein the operations further comprise:
determine, based on the selected gaze target, augmented reality information for display.

20. The eye tracking computation device of claim 13, wherein the gaze direction information and the digital scene information, respectively, comprise real time gaze direction information and real time digital scene information, and wherein the operations further comprise:
modify the selected gaze target in real time as the real time gaze direction information and real time digital scene information are received.

21. A non-transitory computer readable storage medium having computer executable instructions executable by a processor, wherein the instructions, in response to execution by the processor, cause the processor to perform operations that comprise:
obtain gaze direction information for at least one eye from an eye-facing sensor;
detect, based on the gaze direction information, a gaze target corresponding to a scene visible to the at least one eye;
determine, based on the gaze direction information, position and motion information of the detected gaze target;
obtain digital scene information from a digital camera, wherein the digital camera is oriented to capture the digital scene information from the scene visible to the at least one eye;

analyze the digital scene information to identify one or more potential gaze targets within the digital scene information, wherein the one or more potential gaze targets correspond to one or more objects in the scene visible to the at least one eye;

determine, based on the analysis of the digital scene information, respective position and motion information of the one or more potential gaze targets within the digital scene information;

compare the position and motion information of the detected gaze target with the respective position and motion information of the one or more potential gaze targets to select a gaze target from among the one or more potential gaze targets;

modify the position and motion information of the detected gaze target to correspond to position and motion information of the selected gaze target, so as to correct the detected gaze target to correspond to the selected gaze target, wherein the selected gaze target is positioned as an object in the scene visible to the at least one eye and qualifies as a user input for a computation device, and wherein the detected gaze target does not qualify as a user input for the computation device; and apply the selected gaze target as the user input to perform at least one function associated with the computation device.

* * * * *